(12) United States Patent
Gabrys (10) Patent No.: US 7,105,979 B1
(45) Date of Patent: Sep. 12, 2006

(54) COMPACT HETEROPOLAR HYBRID ALTERNATOR-MOTOR

(76) Inventor: Christopher W. Gabrys, 1001 S. Meadows Pkwy. #1126, Reno, NV (US) 89521

( * ) Notice: Subject to any disclaimer, the term of this patent is extended or adjusted under 35 U.S.C. 154(b) by 187 days.

(21) Appl. No.: 10/615,758

(22) Filed: Jul. 8, 2003

Related U.S. Application Data (60) Provisional application No. 60/394,374, filed on Jul. 8, 2002.

(51) Int. Cl.
*H02K 1/00* (2006.01)
*H02K 3/00* (2006.01)

(52) U.S. Cl. ...................... 310/266; 310/268
(58) Field of Classification Search .......... 310/156.53, 310/181, 68 R, 216, 254, 184, 266, 265, 310/267, 268
See application file for complete search history.

(56) References Cited

U.S. PATENT DOCUMENTS

| | | | | | |
|---|---|---|---|---|---|
| 3,740,836 | A | * | 6/1973 | Kumada et al. ............... | 29/598 |
| 3,922,574 | A | * | 11/1975 | Whiteley ............... | 310/156.32 |
| 3,993,920 | A | * | 11/1976 | Sato ........................... | 310/66 |
| 4,093,882 | A | * | 6/1978 | Furuta ........................ | 310/268 |
| 4,656,379 | A | | 4/1987 | McCarty ..................... | 310/181 |
| 4,677,335 | A | * | 6/1987 | Ueda et al. .................. | 310/268 |
| 4,720,650 | A | * | 1/1988 | Hanamori et al. ........... | 310/266 |
| 4,831,300 | A | | 5/1989 | Lindgren .................... | 310/190 |
| 5,081,388 | A | * | 1/1992 | Chen .......................... | 310/266 |
| 5,436,518 | A | * | 7/1995 | Kawai ..................... | 310/156.18 |
| 5,731,649 | A | * | 3/1998 | Caamano .................... | 310/216 |
| 5,942,829 | A | | 8/1999 | Huynh ........................ | 310/178 |
| 6,011,337 | A | * | 1/2000 | Lin et al. ............... | 310/156.37 |
| 6,046,518 | A | * | 4/2000 | Williams ..................... | 310/43 |
| 6,075,302 | A | | 6/2000 | McCleer ..................... | 310/166 |
| 6,097,124 | A | | 8/2000 | Rao et al. ................... | 310/156 |
| 6,246,146 | B1 | * | 6/2001 | Schiller ...................... | 310/268 |
| 6,373,162 | B1 | * | 4/2002 | Liang et al. ........... | 310/156.53 |

* cited by examiner

*Primary Examiner*—Tran Nguyen
(74) *Attorney, Agent, or Firm*—J. Michael Neary (57) ABSTRACT

A brushless hybrid electrical machine for converting between electrical and mechanical energy has a rotor supported for rotation about an axis of rotation relative to a juxtaposed stator that is stationary and magnetically interacts with the rotor. The rotor includes a ferromagnetic rotor structure having two portions spaced apart, but rotating together, and defining therebetween an armature air gap. Magnetic poles are arranged in a circumferentially alternating array of ferromagnetic and permanent magnet poles, bordering the air gap. A stationary air core armature having multiple phase windings is located in the armature air gap, and a field coil is also positioned between the two portions of the rotor for generating field coil flux that flows in a flux path through the ferromagnetic poles, the armature air gap and through the ferromagnetic rotor structure. The permanent magnet poles generate permanent magnet flux that also flows in a flux path through the armature air gap and through the ferromagnetic rotor structure. The field coil flux and the permanent magnet flux induces an AC voltage in the multiple phase windings of the air core armature as said rotor rotates.

18 Claims, 9 Drawing Sheets

COMPACT HETEROPOLAR HYBRID ALTERNATOR-MOTOR

This is related to U.S. Provisional Application No. 60/394,374 filed on Jul. 8, 2002 and entitled "Compact Heteropolar Hybrid Alternator-Motor".

This invention pertains to electrical machines for converting between electrical and mechanical energy and more particularly to a heteropolar hybrid alternator/motor that has an array of ferromagnetic and permanent magnet poles around a circumference, wherein the ferromagnetic poles are magnetized by a stationary field coil. Fluxes from both the ferromagnetic poles and permanent magnet poles pass through an air core armature located in a magnetic air gap in the rotor. The fluxes travel in the same or opposite directions through the rotor depending on the polarity of the field coil current and allow control of the back emf generated in the armature. The heteropolar hybrid electrical machine has increased efficiency and more compact, lower cost construction than previous devices.

BACKGROUND OF THE INVENTION

Electrical motors and generators can employ a permanent magnet generated field or electromagnetic generated field using a field coil. Permanent magnet machines induce voltages in the armature coils that vary with the rotational speed of the rotor. Machines using a field coil for generation of flux have the benefit of allowing control of the voltage induced in the armature coils by varying the current to the field coil. However, the machine requires a constant power draw to maintain the field flux and is usually larger in size. A hybrid type machine can be used in which the flux through the armature coils results from both a field coil and from a permanent magnet. The result is a more robust and compact device in which the induced voltage can be controlled. Unfortunately, current hybrid electrical machines are complex and costly in construction, and have lower power capability or less than optimal efficiency, or both.

SUMMARY OF THE INVENTION

The invention provides a heteropolar hybrid alternator motor for converting between electrical and mechanical energy that has a compact and low cost construction with both increased power capability and efficiency. The hybrid machine is constructed of a rotor and a stator. The rotor is comprised of a ferromagnetic rotor structure having alternating ferromagnetic and permanent magnet poles around a circumference. The poles face a magnetic air gap that is created in the ferromagnetic rotor structure. The stator includes an air core armature having windings located in the magnetic air gap, and a field coil that generates field coil flux through the ferromagnetic poles.

Both the permanent magnet flux and the field coil flux induce an AC voltage in the armature windings of the air core armature that is located between two surfaces of the rotating rotor to minimize losses as the rotor rotates. Unlike homopolar hybrid configurations that can avoid magnetic losses by having homopolar poles, that is, all poles having the same polarity around the armature circumference, the alternator motor in accordance with this invention utilizes alternating poles to provide greater variation of flux through the armature as the rotor rotates, thereby achieving higher voltage and power capability. Unlike previous heteropolar designs that use slot wound stators causing the permanent magnet flux to flow primarily circumferentially and having increased losses, the preferred embodiment of the invention minimizes the core losses by having an air core armature. The air core armature however requires a much larger air gap between the rotor and stator to facilitate placement of the windings that would otherwise be placed in slots, typically by a factor of ten or higher. This increased air gap unfortunately greatly increases the reluctance of the magnetic circuits in the hybrid machine and requires a greater magnetomotive force to produce the same flux density. However, this drawback is offset by the benefits achieved by the invention that will be described. The magnetic air gap therefore becomes the majority of the reluctance in both the flux paths of the permanent magnets and the field coil. The lowest reluctance path for flux from the permanent magnets now bridges the armature air gap and travels axially and radially through the ferromagnetic rotor structure instead of traveling circumferentially and bridging the armature air gap twice.

Without power applied to the field coil or when power is applied with a polarity that bucks the induced armature voltage by magnetizing the steel poles with the same polarity as the permanent magnets, the permanent magnet flux travels primarily axially and radially through the ferromagnetic rotor structure. When current is applied to the field coil to boost the induced voltage in the armature coils by magnetizing the ferromagnetic rotor poles with a polarity that is opposite the permanent magnets, the permanent magnet flux can flow axially and radially as well as circumferentially. The axial and radial flowing permanent magnet flux flows in the opposite direction as the axial and radial flowing field coil flux, thereby reducing the total flux density in the ferromagnetic rotor structure. Therefore, a smaller and more compact rotor structure can be used with saturation for higher power output.

The hybrid machine also avoids the added weight from the slot wound core and the inherent efficiency losses. Compared with a comparable size homopolar type hybrid alternator motor, the invention can potentially achieve as much as twice the power capability by both having alternating polarity poles and also a higher flux density for a given size ferromagnetic rotor structure. One drawback though is that the permanent magnets must be placed on the rotating rotor and can limit the maximum operating speed. However, in many applications this potential deficiency would not impair its effective implementation. Compared with other hybrid electrical machines that place a permanent magnet magnetically in series with the field coil flux path, the invention provides noncoincidental paths for highly effective operation. Serial designs require the field coil to drive flux through permanent magnets, which have both a high reluctance and can have high coercive forces, leading to poor effectiveness in controlling the induced armature voltage. The inventive alternator motor provides ferromagnetic poles as well as the permanent magnet poles arranged to eliminate the need to drive the field coil flux through the permanent magnets and therefore achieves a very effective control of the induced voltage in the armature.

Besides utilizing a circumferentially alternating permanent magnet and ferromagnetic pole array, increased power capability can be achieved with the addition of opposite polarity permanent magnets. The pole array consists of alternating polarity permanent magnets around the circumference of the rotor. The ferromagnetic poles have reduced size for applications not requiring as much control but desiring higher performance. The ferromagnetic poles can be located circumferentially adjacent to one polarity magnet pole having a reduced circumferential width.

Alternatively, the ferromagnetic poles can be aligned with one polarity of permanent magnet poles and each permanent magnet pole has the same circumferential width. The addition of alternating polarity permanent magnets increases the performance and efficiency while reducing the possible control of the back emf Permanent magnet flux can flow circumferentially between alternating polarity magnets in the rotor. However, the permanent magnet flux again flows in a path primarily excluding the ferromagnetic poles. This can be clearly seen when the field coil power is off.

The air core armature can be constructed in several configurations so long as it is substantially nonmagnetic in the area of the magnetic airgap for low losses. One configuration of armature has wires wound on and bonded to a fiberglass form. To maximize the power capability and efficiency, the active lengths in the magnetic airgap are preferably wound to maximize the winding density, for example, by placing the end turns on one side of the form and active lengths on the other side. Overlapping of end turns prevents increased thickness of the active region and a required increase in the magnetic airgap.

Other methods for air core armature fabrication can also be used including winding onto tooling. In some cases, it is desirable for the electrical machine to produce sinusoidal power when operated as a generator. Matching the circumferential width of the winding active regions with the pole circumferential width can be utilized.

In one embodiment of the invention, the rotor can achieve higher speeds by locating the permanent magnet poles on an inner diameter portion of the ferromagnetic rotor portion. The armature air gap therefore is radial and the ferromagnetic rotor structure supports the permanent magnets against centrifugal loading.

In another embodiment of the invention, the armature air gap is axial, for easy armature construction and assembly. The permanent magnets are radially reinforced by a high strength band. The band preferably has a low magnetic permeability to prevent significant shorting of the magnet's flux.

In another embodiment of the invention, the permanent magnets are located on the inner diameter of the armature air gap. The magnets are radially constrained by a high strength band that is also preferably nonmagnetic.

In yet another embodiment of the invention, the field coil flux and permanent magnet flux traverse two portions of a ferromagnetic rotor structure that are separated by a magnetic insulator, and pass through a ferromagnetic stator portion that is located away from the armature air gap and supports the field coil. Locating the stator portion away from the armature air gap smoothes the fluxes to be substantially circumferentially uniform before traveling through the ferromagnetic stator portion. This configuration provides a solid mount for the field coil and provides good heat transfer from the field coil.

In another embodiment, the field coil is located on and supported by the rotor. In this design, slip rings, an exciter or a rotary transformer powers the field coil. With a rotating field coil, speed capability may be reduced, however a single magnetic airgap is used for higher flux density and the field coil heat can be dissipated to the mass of the rotor.

In yet a further embodiment, the magnetic airgap is bounded by the rotor on only one side. The other side of the airgap uses a laminated or other conventional eddy current loss mitigating structure. The magnetic losses of the electrical machine are increased because a rotating circumferentially magnetic field is passed through a lamination stack. One benefit is potentially improved air core armature heat transfer if located against the lamination stack. The magnetic airgap in this case may also be slightly reduced.

The invention has many promising applications that include motors, alternators and generators for vehicles, power systems and commercial and industrial applications. In yet a further embodiment of the invention, the hybrid electrical machine is used to convert between electrical and mechanical energy in a flywheel energy system. The use of permanent magnets can increase the standby and operating efficiency over a field coil only machine. Likewise, the field coil provides for simple input and output control and voltage regulation for effectively extracting the majority of stored energy from the flywheel. In electrically driven or hybrid vehicles, electrical machines in accordance with the invention can provide the high efficiency and performance of a permanent magnet machine while also providing means for reducing the back emf at higher speeds.

DESCRIPTION OF THE DRAWINGS

The invention and its many attendant features and benefits will become better understood upon reading the following detailed description of the preferred embodiments in conjunction with the drawings, wherein.

DESCRIPTION OF THE PREFERRED EMBODIMENT

Figure 1:
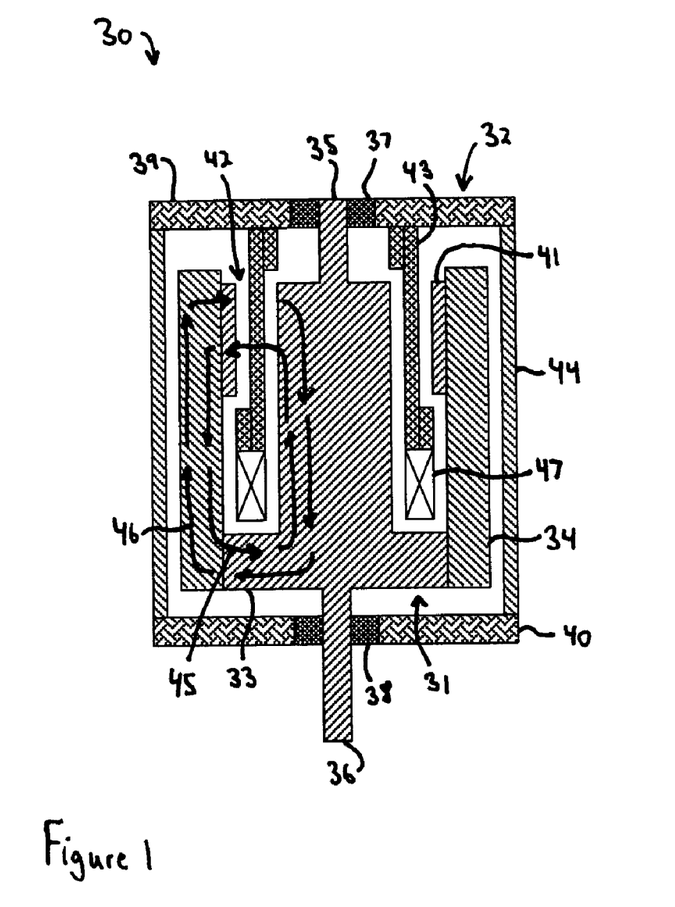
FIG. 1 is a schematic elevation of a heteropolar hybrid alternator motor in accordance with the invention.
Figure 1A:
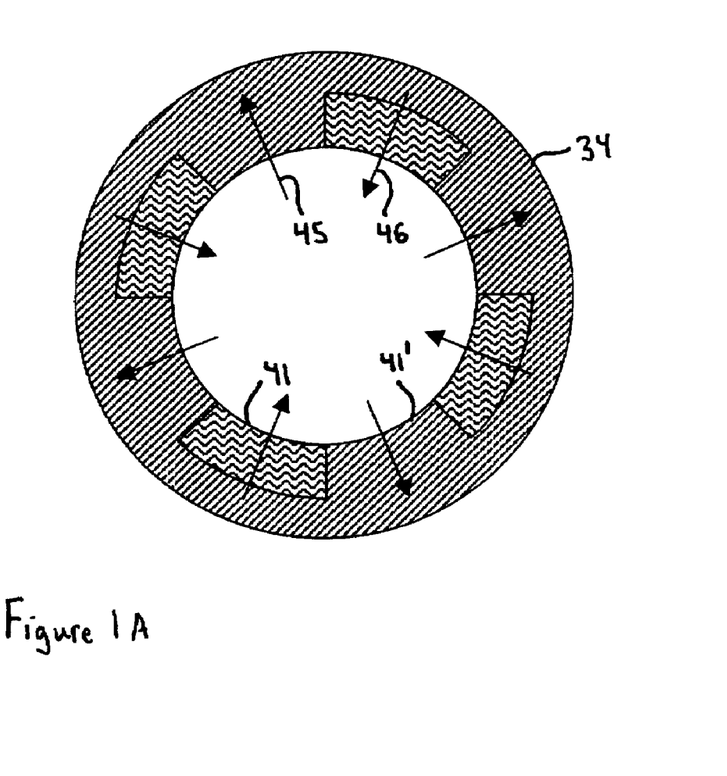
FIG. 1A is a cross-sectional plan view of the outer ring of the rotor shown in FIG. 1, showing the alternating ferromagnetic poles and magnetic poles.

Turning to the drawings, wherein like reference characters designate identical or corresponding parts, a heteropolar hybrid alternator motor 30 shown in FIG. 1 includes a rotor 31 mounted for rotation within a stationary stator 32. The rotor 31 has a cylindrical ring portion 34 attached to a central core portion 33, both made of ferromagnetic material such as steel. A plurality of alternating, spaced apart permanent magnet poles 41 and ferromagnetic poles 41' are arranged in a regularly spaced array around the inner circumference of the ring portion 34, as shown in FIG. 1A. The poles 41 and 41' face an armature air gap 42 that is created between the two portions 33, 34 of the ferromagnetic rotor 31. In this configuration of the invention the permanent magnet poles 41 are located on an inner circumference of the outer ring 34 so that the ferromagnetic rotor structure radially reinforces the magnets 41 against centrifugal loading. The permanent magnets 41 generate permanent magnet flux 46 that passes through the armature air gap 42 and the ferromagnetic rotor structure 33, 34.

The rotor 31 is journalled for rotation on shafts 35, 36 that are supported by bearings 37, 38 attached to end plates 39, 40. The end plates 39, 40 are connected by an outer tube 44. The stator 32 includes an air core armature 43 in the armature air gap 42, having multiple phase windings wound on a tubular form made of fiberglass or other non-conductive and non-magnetic material that can be made strong enough to withstand the torque exerted thereon by the magnetic forces acting on the armature. The use of an air core armature 43, or essentially nonmagnetic stator, eliminates magnetic losses that would otherwise occur, prevents cogging and provides for lower inductance than a slot-wound armature. The air core armature also eliminates the need for laminations that would add costs. Some laminations or low magnetic loss material could be used for the ferromagnetic rotor poles 41' to further reduce any losses from the transient switching armature currents, although this could add cost and complexity. Because both sides of the armature air gap 42 are bounded by the rotating rotor 31, such losses will be small. Some ferromagnetic material could conceivably be placed on the armature as long as it were made small or located outside the armature air gap in order to minimize any losses.

The stator 32 also comprises a field coil 47 that generates a field coil flux 45 that passes through the ferromagnetic poles 41', the armature air gap 42 and the ferromagnetic rotor structure 33, 34. The field coil is supported on the lower end of the tubular form on which the armature coils are wound. As the rotor 31 rotates, the permanent magnet flux 46 and field coil flux 45 induce an AC voltage in the windings of the air core armature 43. Without any current applied to the field coil 47 or when the applied current has a polarity to buck the induced armature voltage by magnetizing the ferromagnetic and permanent magnet poles 41 to have the same polarity, the permanent magnet 46 flux flows primarily radially and axially through the ferromagnetic rotor structure 33, 34. When current is applied to the field coil 47 with a polarity such that it boosts the induced voltage in the armature 43 by magnetizing the ferromagnetic and permanent magnet 41 poles to have opposite polarities, as shown in FIG. 1A, the permanent magnet flux 46 can flow axially and radially as well as circumferentially. When boosting the induced voltage, the permanent magnet flux 46 and field coil flux 45 travel axially and radially in opposing directions. The total flux density in the ferromagnetic rotor structure 33, 34 is therefore reduced, thereby allowing a smaller and more compact ferromagnetic rotor structure 33, 34 without saturating.

Figure 2A:
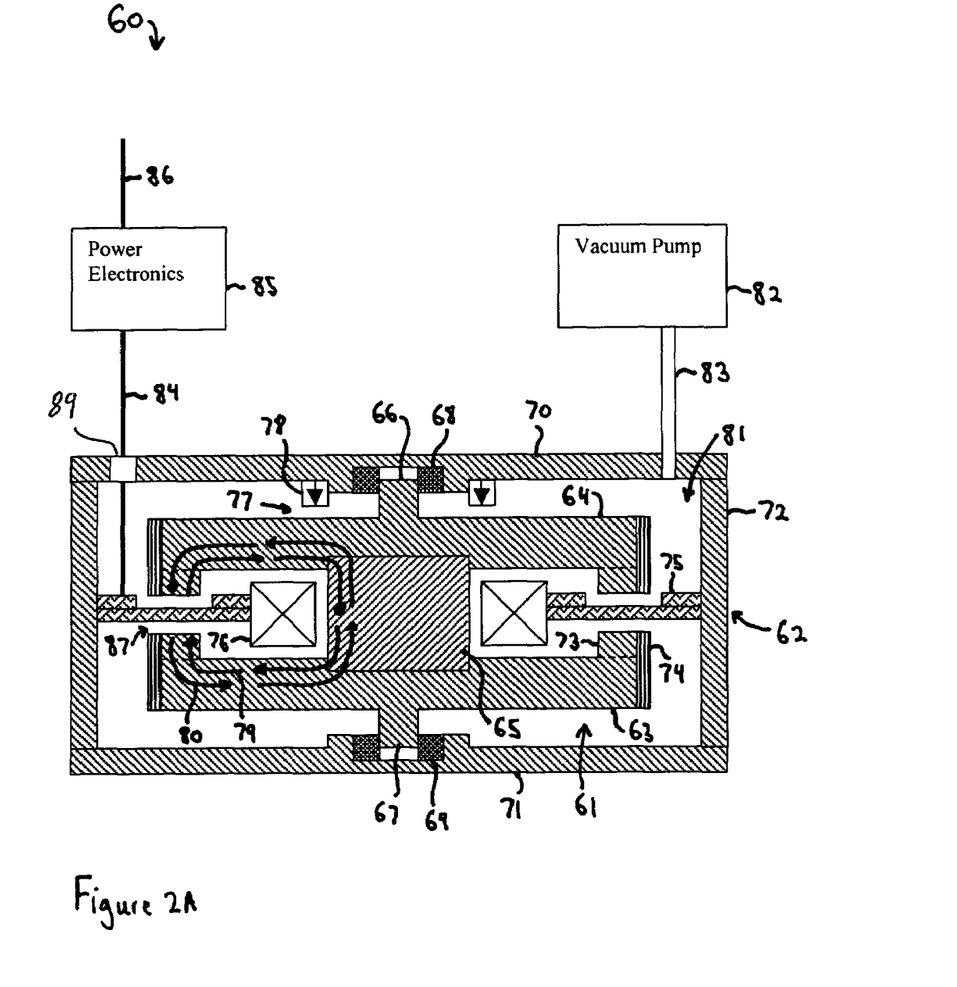
FIG. 2A is a schematic drawing of a flywheel energy system using a heteropolar hybrid alternator motor in accordance with the invention.
Figure 2B:
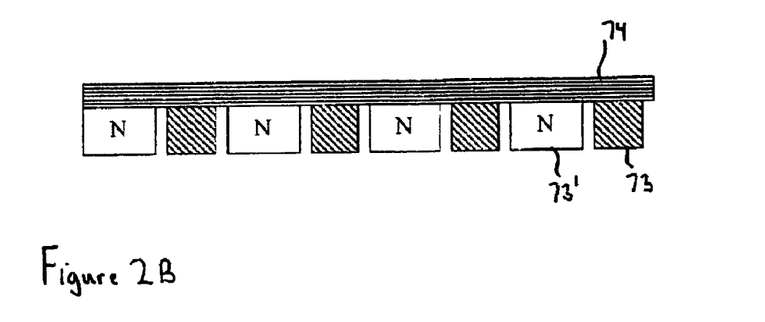
FIG. 2B is a developed view of the heteropolar hybrid alternator motor of the flywheel energy system of FIG. 2A.

One promising application for use of the hybrid electrical machine is in flywheel energy systems for converting between electrical and mechanical energy. Electrical machines in accordance with this invention can be implemented in many configurations for use in a flywheel system. Such a flywheel energy system, using a heteropolar hybrid alternator motor 60 in accordance with the invention is shown in FIG. 2A. The flywheel system 60 is constructed with a flywheel rotor 61 rotating relative to a fixed stator 62. The rotor 61 includes a ferromagnetic rotor structure having upper and lower ferromagnetic flywheel discs 63, 64, and a central ferromagnetic spacer plug 65 spacing the discs 63, 63 axially apart. The axially facing outer periphery of one or both of the discs 63, 64 has a circumferentially spaced array of alternating ferromagnetic poles 73 and permanent magnet poles 73' around an outer circumference, as shown in FIG. 2B. Only one of the discs 63, 64 has poles 73, 73' in FIG. 2B. In the configuration shown in FIG. 2A, the ferromagnetic flywheel discs 63, 64 define therebetween an axial armature air gap 87, with the poles 73 and 73' facing the armature air gap 87. The permanent magnets 73' are radially reinforced or contained by a high strength band 74. The band 74 can be made of steel but is preferably made of low permeability or nonmagnetic material so as to prevent magnetic shorting. Stainless steel or composite materials are suitable materials for the reinforcing band 74.

The rotor 61 has upper and lower shafts 66, 67 that rotate in upper and lower bearings 68, 69 attached to upper and lower container plates 70, 71. The container plates are connected by an outer container tube 72 of the stator 62. A magnetic bearing 77 using an annular permanent magnet 78 can also be included to lessen the load on the mechanical bearings 68, 69. Other bearing systems could also be used.

The stator 62 comprises an air core armature 75 that is located in the armature air gap 87, and a field coil 76. The armature can be wound on a rigid supporting form disc such as plastic, fiberglass, quartz or other strong and rigid nonconducting and non-magnetic material capable of transferring torque to the stator 72, and preferably has good thermal conductive properties. The field coil 76, supported on the inner circumference of the form disc, generates field coil flux 79 that travels through the ferromagnetic rotor structure 63, 64, 65 and bridges the armature air gap 87. The permanent magnets 73 generate permanent magnet flux 80 that also passes through the ferromagnetic rotor structure 63, 64, 65 and bridges the armature air gap 87.

Electrical cables 84 for the armature 75 and the field coil 76 exit the container 70, 71, 72 through a sealed feedthrough 89 and are connected to power electronics 85 for converting to power applied to a power buss 86. The power electronics 85 preferably provide synchronous AC power to the armature 75 for accelerating the flywheel 61 and storing energy. During discharging, electrical power is generated in the armature 75 and converted using the power electronics 85. Current applied to the field coil 76 can increase or reduce the induced voltage in the armature 75 for a given rotational speed. The container 70, 71, 72 has an internal chamber 81 that is preferably maintained at low pressure for reducing aerodynamic drag. An external vacuum pump 82 connected to the container 70, 71, 72 through a vacuum pumping port 83 is one method that can be used.

The heteropolar hybrid alternator motor of the flywheel energy system of FIG. 2A, shown in a developed or laid-out view in FIG. 2B, has alternating ferromagnetic poles 73 and permanent magnet poles 73' around the circumference of the rotor disc 63 where it bounds the air gap 87. Although shown with poles 73, 73' only on one side of the armature air gap 87, they could be placed on both sides for increase variation of fluxes. The permanent magnets 73' are shown with a reduced width to reduce any shorting of flux to the ferromagnetic poles 73, however they could be made with the same or even greater width for changing the performance if desired. As shown the permanent magnet flux 80 is in the opposite direction as the field coil flux 79, thereby illustrating the invention boosting the induced voltage in the air core armature 75.

Figure 2C:
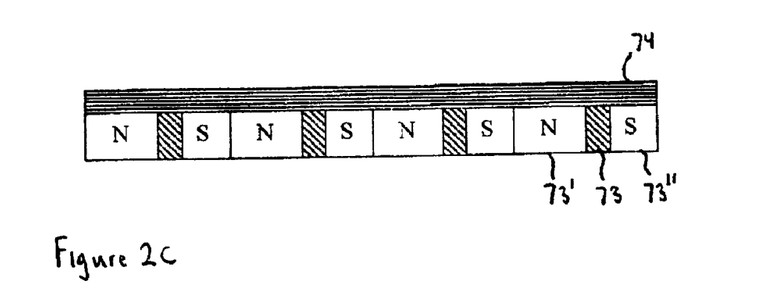
FIG. 2C is a developed view of an alternate configuration heteropolar hybrid alternator motor of the flywheel energy system of FIG. 2A.

A developed or laid-out plan view of a portion of the rotor disc 63 where it bounds the air gap 87 in an alternate configuration heteropolar hybrid alternator motor of the flywheel energy system of FIG. 2A is shown in FIG. 2C. In some cases, only a small amount of control is required and it is also desirable to have increased efficiency and performance. In this case, alternating polarity permanent magnets can be utilized on the rotor. The size of the ferromagnetic poles can be reduced. The permanent magnet poles 73' are now placed adjacent to the ferromagnetic poles 73, or reduced circumferential width, and other permanent magnet poles 73" having the opposite polarity. With the addition of the alternating polarity magnets 73", the permanent magnet flux can link circumferentially between permanent magnets 73' and 73". Again the permanent magnet flux flows in a path primarily excluding the ferromagnetic poles 73.

Figure 2D:
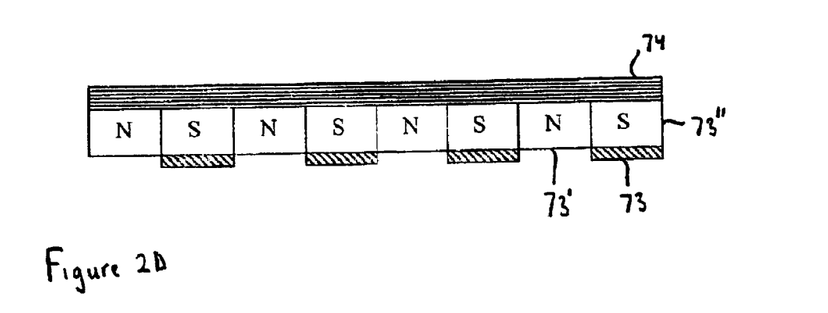
FIG. 2D is a developed view of a second alternate configuration heteropolar hybrid alternator motor of the flywheel energy system of FIG. 2A.

A developed view of a second alternate configuration heteropolar hybrid alternator motor of the flywheel energy system of FIG. 2A is shown in FIG. 2D. Depending on the windings layout of the air core armature, having poles of varying circumferential width can produce irregular waveforms, which may not always be acceptable. To over come this, the permanent magnet poles 73' can be placed circumferentially adjacent to other permanent magnet poles 73" having the opposite polarity. The ferromagnetic poles 73 are then aligned with the one polarity of permanent magnet poles 73' or 73".

Figure 3:
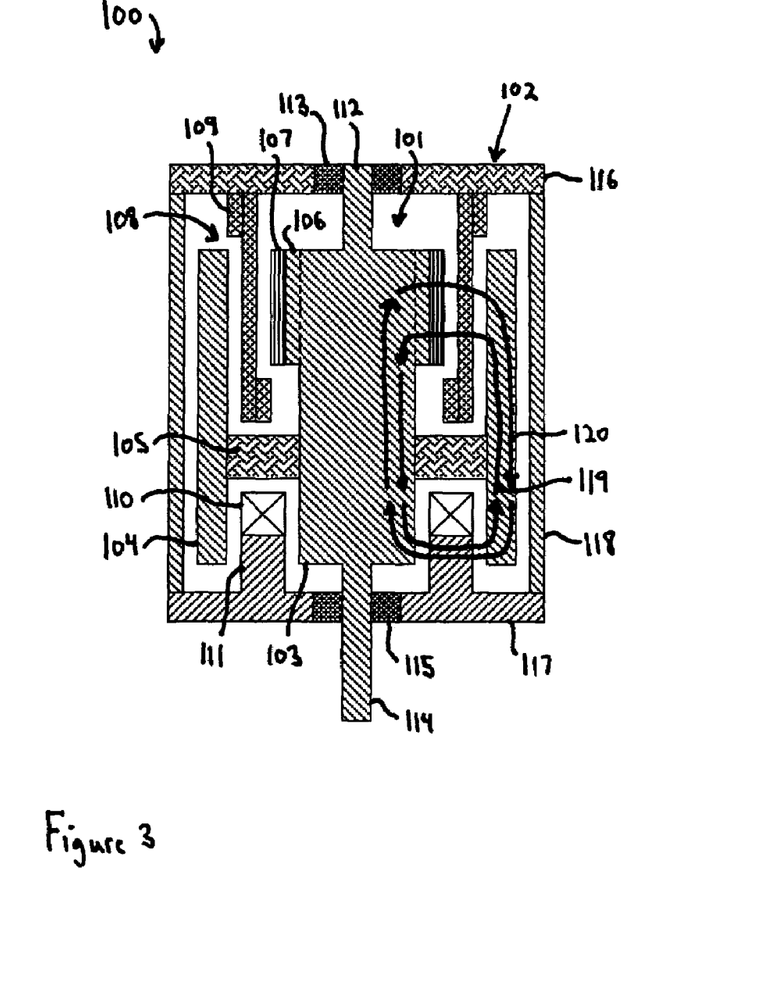
FIG. 3 is a schematic drawing of an alternate configuration heteropolar hybrid alternator motor in accordance with the invention.

An alternate configuration heteropolar hybrid alternator motor 100, shown in FIG. 3, includes a rotor 101 mounted for rotation relative to a fixed stator 102. The rotor has a ferromagnetic rotor core 103 and a concentric cylindrical tubular portion 104 attached and spaced apart from the core 103 by magnetic insulator ring 105, producing a radial annular air gap 108 between the tubular portion 104 and the core 103. An alternation of ferromagnetic and permanent magnet poles 106 is attached around a circumference of the rotor 101 bordering the air gap 108. In this configuration, the permanent magnet poles are located on outer circumference of the core 103, which is the inner diameter of the radial armature air gap 108. A high strength band 107 is preferably used to radially reinforce the magnets 106 against centrifugal loading and the band 107 is preferably made from nonmagnetic or low permeability material to prevent losses. The permanent magnets forming the permanent magnet poles could instead be placed on the inside surface of the tubular portion 104, where they would be supported against centrifugal loading by the tubular portion 104. Also, ferromagnetic poles can be formed on the other side of the airgap 108 to help focus the flux directly across the airgap and minimize leakage flux.

The rotor 101 is journalled for rotation using shafts 112, 114 supported in bearings 113, 115 attached to housing end plates 116, 117. The end plates 116, 117 are connected by an outer tube 118. The stator 102 includes an air core armature 109 having armature windings on a tubular form supported on the top end plate 116 and extending axially into the armature air gap 108. The stator also includes an annular field coil 110 supported between the core 103 and the tubular portion 104 of the rotor 101 on a support ring 111 on the bottom end plate 117. The field coil generates a field coil flux 119 that passes through the ferromagnetic rotor structure 103, 104 and bridges the armature air gap 108. The permanent magnets 106 generate permanent magnet flux 120 that also bridges the armature air gap 108 and travels through the ferromagnetic rotor structure 103, 104. In this configuration of the invention, the permanent magnet flux 120 and field coil flux 119 also pass through the ferromagnetic stator support ring 111 that is located away from the armature air gap 108. This configuration can be used to provide rigid support for the field coil 110 and good heat transfer. Because the ferromagnetic stator structure is located away from the armature air gap 108, the varying flux through the armature 109 is smoothed to be substantially circumferentially uniform before passing through the ferromagnetic stator structure 111, reducing any magnetic losses. To implement this configuration, the magnetic insulator 105 spacing the ferromagnetic rotor structure 103, 104 apart prevents shorting of the field coil flux 119 that would otherwise occur.

Figure 4:
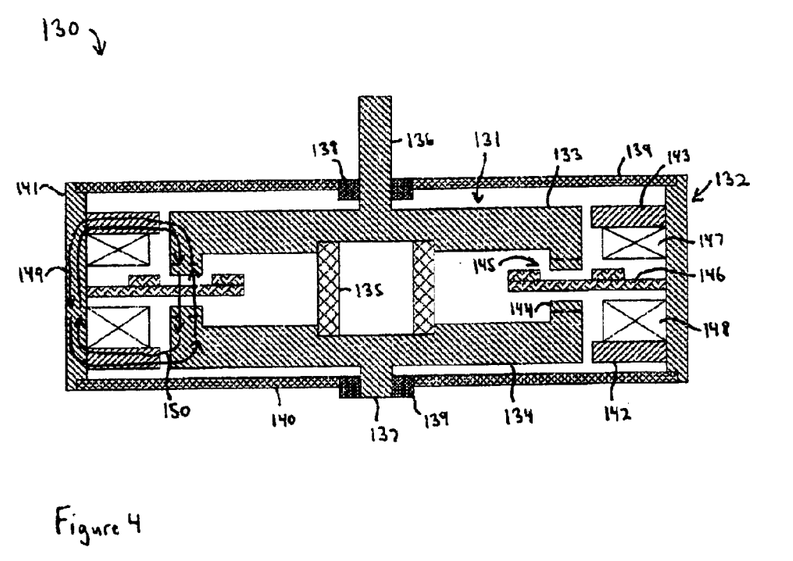
FIG. 4 is a schematic drawing of a second alternate configuration heteropolar hybrid alternator motor in accordance with the invention.

A second alternate configuration heteropolar hybrid alternator motor 130 in accordance with the invention, shown in FIG. 4, includes a rotor 131 and a stator 132. The rotor 131 is constructed of two steel discs 133, 134 that are assembled together with a stainless steel center connection tube 135 of low magnetic permeability. Each disc 133, 134 comprises a circumferential array of permanent and ferromagnetic poles 144 that face a magnetic airgap 145 created between the two discs 133, 134. An air core armature 146 is attached to the stator 132 and has windings located in the magnetic airgap 145. Field coils 147, 148 drive a field coil flux 149 through the rotor 131 using yoke pole rings 142, 143. The array of permanent magnet poles 144 also creates a permanent magnet flux 150 that flows through the rotor 131 and stator 132. The permanent magnet flux 150 and field coil flux 149 are circumferentially smoothed in the rotor discs 133, 134 such that large magnetic losses do not occur in the yoke rings 142, 143 as the rotor 131 rotates. The rotor 131 is supported by shafts 136, 137 that rotate in bearings 138, 139, which are mounted to housing end plates 139, 140. An outer housing tube 141 connects the end plates 139, 140.

Figure 5A:
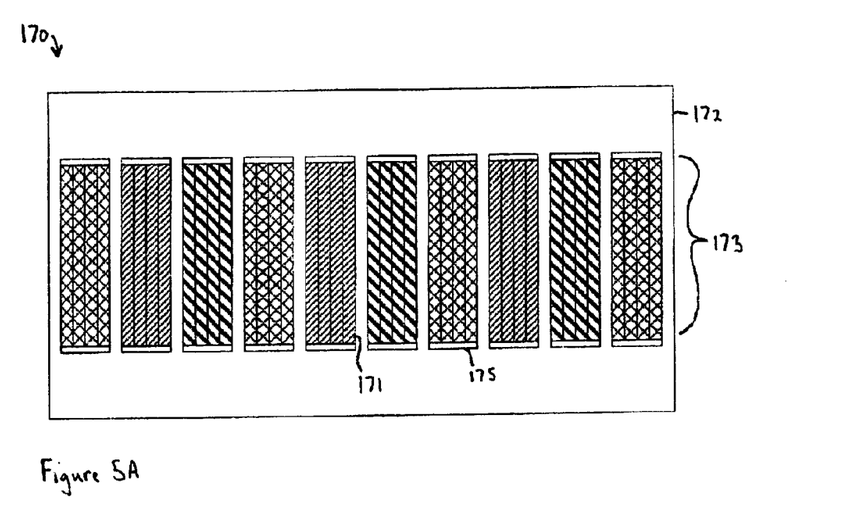
FIG. 5A is a circumferential section of one side of a of an air core armature for a heteropolar hybrid alternator motor in accordance with the invention.
Figure 5B:
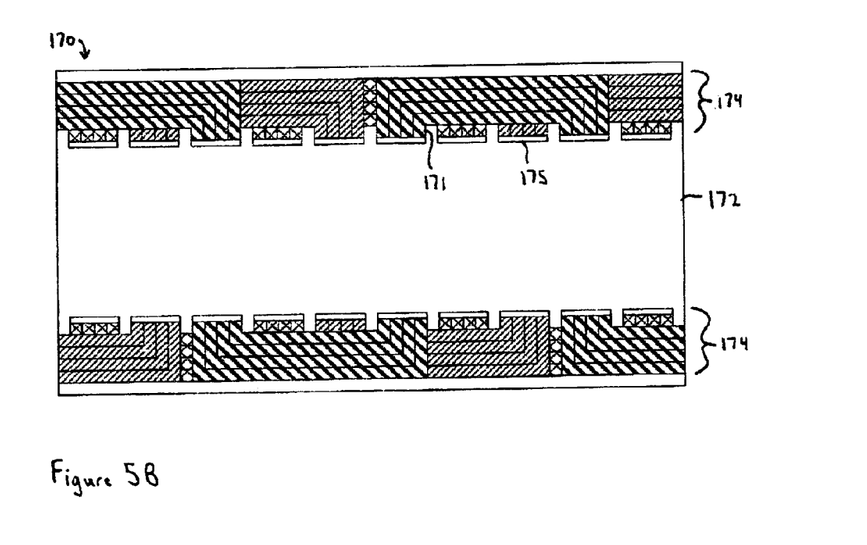
FIG. 5B is a circumferential section of the opposite side of the air core armature shown in FIG. 5A.

The air core armature utilized in the electrical machine can be constructed in several configurations, so long as it is substantially nonmagnetic in the magnetic airgap of the electrical machine. Circumferential views of both sides an air core armature 170 for a heteropolar hybrid alternator motor in accordance with the invention are shown in FIGS. 5A and 5B. The air core armature 170 is comprised of Litz wire windings 171 that are wound on to and bonded to a plastic or fiberglass form 172. The windings 171 comprise active lengths 173 that are located in the magnetic airgap and end turns 174 that circumferentially connect the active lengths 173. For achieving the highest performance, the windings 171 in the active length 173 preferably have the highest possible winding density. The windings 171 pass through holes 175 in the form 172 so that the active lengths 173 lie on one side and the end turns 174 lie on the opposite side. Overlapping of the end turns 174 does not cause an increase in the thickness of the active length 173. A smaller magnetic airgap or increased windings can be used for increased performance and efficiency.

Figure 6:
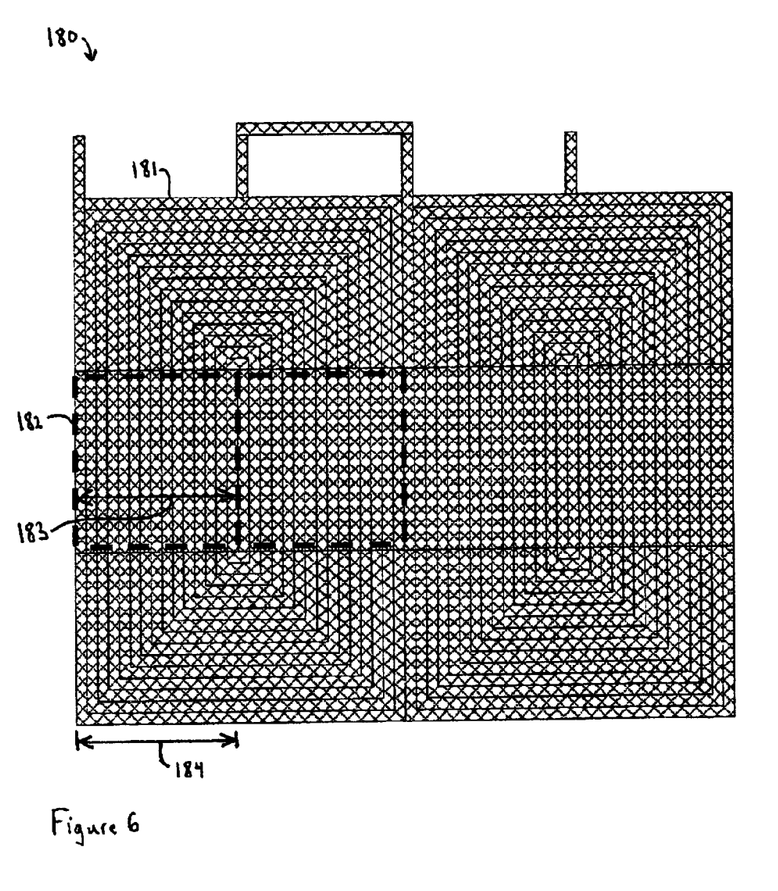
FIG. 6 is a circumferential section of an alternate configuration air core armature for a heteropolar hybrid alternator motor in accordance with the invention.

In some cases, it is desirable to produce a sinusoidal back emf waveform such as for use with sinusoidal motor drives, smooth torque and or generator applications. A circumferential section of an alternate configuration air core armature for a heteropolar hybrid alternator motor in accordance with the invention is shown in FIG. 6. The air core armature 180 comprises Litz wire windings 181 that are wound on to tooling, not shown, for construction. A single direction of active length conductor circumferential width 184 is approximately equal to the circumferential width 183 of a magnetic pole. The magnetic poles 182 induce sinusoidal voltage in the windings 181 as the rotor rotates.

Figure 7:
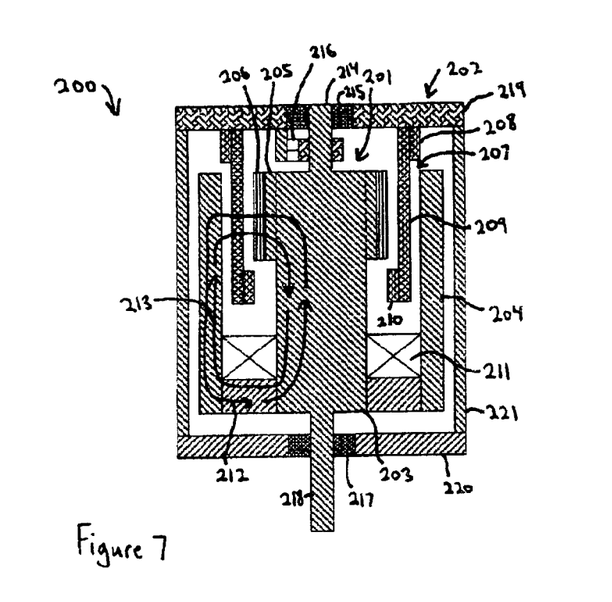
FIG. 7 is a schematic drawing of a third alternate configuration heteropolar hybrid alternator motor in accordance with the invention.

In a further embodiment of the invention, shown in FIG. 7, a field coil 211 may be located on the rotor 201 of an electrical machine 200. The rotor 201 has an inner steel cylinder 203 and an outer steel shell 204 that are separated on one end to form a radial magnetic airgap 207. The inner steel cylinder has a circumferential array of permanent magnet and ferromagnetic poles 205 that face the magnetic airgap 207. A thin, high strength band 206 provides outer reinforcement. An air core armature 208 is attached to the stator 202 and has active length windings 209 in the magnetic airgap 207 and end turns 210 on each end. The field coil 211 is supported by the rotor 201 and is powered by an external power supply (not shown) by way of slip rings 216. The field coil 211 drives a field coil flux 212 through the rotor 201 and magnetic airgap 207. The permanent magnets 205 also drive a permanent magnet flux 213 through the rotor 201 and magnetic airgap 207. The rotor 201 is supported by shafts 214, 218 that are journalled in bearings 215, 217. The bearings 215, 217 are mounted in housing end plates 219, 220 and an outer housing tube 221 connects the end plates 219, 220 together.

Figure 8:
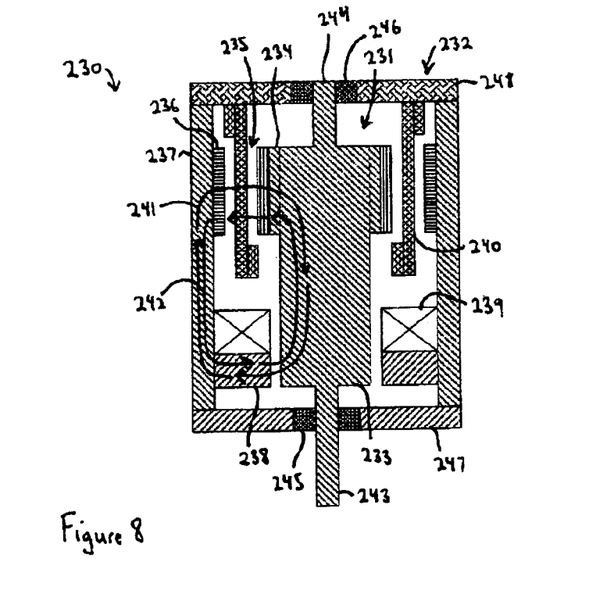
FIG. 8 is a schematic drawing of a fourth alternate configuration heteropolar hybrid alternator motor in accordance with the invention.

A fourth alternate configuration heteropolar hybrid alternator motor 230 in accordance with the invention, shown in FIG. 8, is configured such that only one side of the magnetic airgap is bounded by the rotor. The electrical machine 230 is comprised of a rotor 231 and a stator 232. The rotor 231 is a steel cylinder 233 with a circumferential array of permanent magnet and ferromagnetic poles 234 that face a magnetic airgap 235 formed between the rotor 231 and an outer lamination stack 236. The lamination stack 236 is attached to an outer steel stator housing 237 having a yoke ring 238 at the opposite end. A field coil, attached to the housing 237 drives a field coil flux 241 through the rotor 231 and housing 237. The permanent magnets 234 also drives a permanent magnet flux 242 through the rotor 231 and housing 237 in a path primarily excluding the ferromagnetic poles, clearly seen when the field coil power is off. The lamination stack 236 circumferentially smoothes circumferentially varying and rotating fluxes 241, 242 from the array 234. Although magnetic losses are generated in the laminations, losses are reduced compared to slot wound constructions because of the smooth bore and air core armature 240 inserted in the magnetic airgap 235. The air core armature 240 can be placed against the lamination stack 236 for improved heat transfer, structural support and reduced magnetic airgap thickness 235, if desired. The rotor 231 is supported by shafts 243, 244 that are journalled in bearings 245, 246. The bearings 243, 244 are mounted in housing end plates 247, 248, which are connected by the housing 237. Although not all of the possible benefits of the invention are achieved in this embodiment, magnetic losses are increased, and use of laminations is required, one potential advantage is improved air core armature heat transfer and possibility reduced magnetic airgap thickness, at the expense of reduced efficiency and increased costs.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims.

I claim:

1. A brushless hybrid electrical machine for converting between electrical and mechanical energy comprising:
   a rotor supported for rotation about an axis of rotation relative to a juxtaposed stator that is stationary and magnetically interacts with said rotor;
   said rotor includes a ferromagnetic rotor structure having poles around a circumference, said poles arranged in a circumferentially alternating array of ferromagnetic and permanent magnet poles;
   said ferromagnetic and permanent magnet poles facing a magnetic air gap created in said ferromagnetic structure;
   said stator having a stationary air core armature located in said magnetic air gap, said air core armature comprising windings;
   said ferromagnetic rotor structure having co-rotating ferromagnetic portions on both sides of said stationary air core armature for conducting magnetic flux to said magnetic air gap and thence through said armature in said magnetic air gap;
   said stator including a field coil connected to power electronics adapted to be energized by an electrical power source, such that said field coil generates field coil flux that flows in a flux path through said co-rotating ferromagnetic rotor portions and said ferromagnetic poles, said magnetic air gap and through said ferromagnetic rotor structure;
   said permanent magnet poles generate permanent magnet flux, said field coil flux and said permanent magnet flux inducing an AC voltage in said windings of said air core armature as said rotor rotates;
   said field coil being connected to said power electronics such that that application of current to said field coil bucks or boosts the AC voltage induced in said windings depending on the polarity of the current to said field coil.

2. A brushless hybrid electrical machine as described in claim 1 wherein:
   said permanent magnet flux flows mostly axially and radially through said ferromagnetic rotor structure when the field current to said field coil is off and when said field current has a polarity structure that said field current bucks said induced AC voltage in said multiple phase windings of said air core armature.

3. A brushless hybrid electrical machine as described in claim 2 wherein:
   said electrical machine is free of laminations.

4. A brushless hybrid electrical machine for converting between electrical and mechanical energy comprising:
   a rotor supported for rotation about an axis of rotation relative to a juxtaposed stator that is stationary and magnetically interacts with said rotor;
   said rotor includes a ferromagnetic rotor structure having poles around a circumference, said poles arranged in a circumferential array of ferromagnetic and permanent magnet poles;
   said permanent magnet poles generate permanent magnet flux, said permanent magnet flux flows in a path primarily excluding said ferromagnetic poles when said field coil is off;
   said ferromagnetic and permanent magnet poles facing a magnetic air gap created in said ferromagnetic structure;
   said stator having a stationary air core armature located in said magnetic air gap, said air core armature comprising windings;

said stator including a field coil connected to power electronics adapted to be energized by an electrical power source such that said field coil generates field coil flux that flows in a flux path through said ferromagnetic poles, said magnetic air gap and through said ferromagnetic rotor structure, thereby inducing an AC voltage in said windings of said air core armature as said rotor rotates;

said field coil being connected to said power electronics such that that application of current to said field coil bucks or boosts the AC voltage induced in said windings depending on the polarity of the current to said field coil.

5. A brushless hybrid electrical machine as described in claim 4 wherein:

said brushless hybrid electrical machine converts between electrical and mechanical energy in a flywheel energy system.

6. A brushless hybrid electrical machine as described in claim 4 wherein:

said rotor comprises a magnetic insulating structure that separates two portions of said ferromagnetic rotor structure such that each portion bounds opposite sides of said magnetic airgap.

7. A brushless hybrid electrical machine for converting between electrical and mechanical energy comprising:

a rotor supported for rotation about an axis of rotation relative to a juxtaposed stator that is stationary and magnetically interacts with said rotor;

said rotor includes a ferromagnetic rotor structure having poles around a circumference, said poles arranged in a circumferential array of ferromagnetic and permanent magnet poles;

said ferromagnetic and permanent magnet poles facing a magnetic air gap defined between co-rotating portions of said rotor;

said stator having a stationary air core armature located in said magnetic air gap, said air core armature comprising windings;

said brushless hybrid electrical machine further comprising a field coil connected to power electronics adapted to be energized by an electrical power source such that said field coil generates field coil flux that flows in a flux path through said ferromagnetic poles, said magnetic air gap and through said ferromagnetic rotor structure;

said permanent magnet poles generate permanent magnet flux, said field coil and said permanent magnets being positioned relative to said rotor and said air core armature such that said field coil flux and said permanent magnet flux induces an AC voltage in said windings of said air core armature as said rotor rotates;

said field coil being connected to said power electronics such that that current can be applied to said field coil to buck or boost the AC voltage induced in said armature windings, depending on the polarity of the current to said field coil.

8. A brushless hybrid electrical machine as described in claim 7 wherein:

said magnetic airgap is bounded on both sides by rotating surfaces of said rotor.

9. A brushless hybrid electrical machine as described in claim 8 wherein:

said brushless hybrid electrical machine comprises only a single magnetic airgap.

10. A brushless hybrid electrical machine as described in claim 9 wherein:

said field coil is supported by said rotor.

11. A brushless hybrid electrical machine as described in claim 9 wherein:

said field coil is supported by said air core armature.

12. A brushless hybrid electrical machine as described in claim 8 wherein:

said circumferential array of ferromagnetic and permanent magnet poles comprises a circumferential alternation of permanent magnet and ferromagnetic poles.

13. A brushless hybrid electrical machine as described in claim 8 wherein:

said circumferential array of ferromagnetic and permanent magnet poles comprises a circumferential array of alternating polarity of permanent magnet poles.

14. A brushless hybrid electrical machine as described in claim 13 wherein:

said permanent magnet flux flows primarily between said alternating polarity permanent magnet poles in said rotor.

15. A brushless hybrid electrical machine as described in claim 13 wherein:

said ferromagnetic poles are located adjacent permanent magnet poles of one polarity.

16. A brushless hybrid electrical machine as described in claim 13 wherein:

said alternating polarity permanent magnet poles are arranged such that one polarity of permanent magnet pole has a shorter circumferential length than the other.

17. A brushless hybrid electrical machine as described in claim 8 wherein:

said permanent magnet poles are located on both sides of said magnetic airgap.

18. A brushless hybrid electrical machine as described in claim 7 wherein:

said air core armature is wound such that AC voltage induced in said windings is sinusoidal.

* * * * *